(12) United States Patent  (10) Patent No.: US 7,719,412 B2
Hattori et al.  (45) Date of Patent: May 18, 2010

(54) TRANSPONDER FOR IN-WHEEL MOTOR SYSTEM AND WHEEL THEREWITH

(75) Inventors: Yutaka Hattori, Kanagawa (JP); Yasuo Hatano, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 887 days.

(21) Appl. No.: 11/578,613

(22) PCT Filed: Apr. 4, 2005

(86) PCT No.: PCT/JP2005/006598

§ 371 (c)(1),
(2), (4) Date: Oct. 12, 2006

(87) PCT Pub. No.: WO2005/100074

PCT Pub. Date: Oct. 27, 2005

(65) Prior Publication Data

US 2007/0205880 A1  Sep. 6, 2007

(30) Foreign Application Priority Data

Apr. 15, 2004 (JP) ............................. 2004-120258

(51) Int. Cl.
*B60C 23/00* (2006.01)
(52) U.S. Cl. ...................................... 340/442; 340/445
(58) Field of Classification Search ................. 340/442, 340/445, 447, 426.33, 572.1; 73/146.5
See application file for complete search history.

(56) References Cited

U.S. PATENT DOCUMENTS 5,889,464 A * 3/1999 Huang ........................ 340/442

FOREIGN PATENT DOCUMENTS

| JP | 02-123404 | 5/1990 |
| JP | 07-013505 | 1/1995 |
| JP | 2002-209343 | 7/2002 |
| JP | 2005-081864 | 3/2005 |

OTHER PUBLICATIONS

International Search Report and Written Opinion of ISA dated Jul. 4, 2005 for PCT/JP2005/006598 filed Apr. 4, 2005.

* cited by examiner

*Primary Examiner*—Daniel Wu
*Assistant Examiner*—Shirley Lu
(74) *Attorney, Agent, or Firm*—Knobbe Martens Olson & Bear, LLP

(57) ABSTRACT

A transponder which does not require a power source used in an in-wheel motor system and a wheel therewith. The transponder comprises a data transmit/receive antenna, a data transmit/receive section, a sensor circuit, and a sensor power circuit. The sensor power circuit is constituted of a rectification circuit (energy converting means), a storage device and a charging coil and the input side of the rectification circuit is connected to a charging coil and the output side of the rectification circuit is connected to the storage device. The transponder is mounted on a motor rotor provided on an internal surface of a rim section in a tire constituting the wheel, and the charging coil is fixed so as to penetrate through a magnetic field produced by a motor stator.

15 Claims, 7 Drawing Sheets

TRANSPONDER FOR IN-WHEEL MOTOR SYSTEM AND WHEEL THEREWITH

TECHNICAL FIELD

The present invention relates to a transponder which does not require a power source used in an in-wheel motor system and a wheel therewith.

BACKGROUND ART

To identify a tire or obtain information such as inner pressure, temperature and rotational speed of a tire, there is known a technique of such a type as to receive electric oscillating energy from a position distant from a specific tire and to transmit a signal from a transponder mounted on a wheel including the tire.

The transponder consists of an integrated circuit and a case for protecting the integrated circuit and the shape thereof is small coin-shaped or columnar or the like.

As this type of technique, there is conventionally proposed a transponder of which embedding position is set at the central portion of a front end level of carcass ply winding section or on a carcass ply outer surface of a pat-less section (for example, refer to Patent Literature 1).

Furthermore, a pneumatic tire fitted with a transponder formed by improving a foregoing technique is proposed (for example, refer to patent Literature 2).

That is, the transponder in the foregoing technique is a foreign substance for a tire and, if embedded into the tire, has a concern of some failure in the transponder itself due to high temperature and pressure received by the transponder during a vulcanization process for tire manufacture, an external force received by the transponder during tire load rolling, and heat or the like generated. To solve these problems, the pneumatic tire includes a pocket for transponder storage at a swelling section provided on an inner-periphery surface of a beads section of a toroidal tire.

Since the swelling section having the pocket for transponder storage is provided at the beads section having little movement during running in the inner-periphery surface of the tire, there is no adverse effect on the tire and the transponder can freely advance and retreat from/into the pocket, therefore the stored transponder can be inspected or freely replaced as needed.

Patent Literature 1: Japanese Utility Model Laid-Open No. H2-123404

Patent Literature 2: Japanese Utility Model Laid-Open No. H7-13505

DISCLOSURE OF THE INVENTION

Problems to be Solved by the Invention

However, most of conventional transponders use a battery to operate an internal electronic circuit respectively and, if the battery becomes exhausted, will not operate. Therefore, periodical replacement of the battery is required, which requires much time and trouble. In a structure having the transponder therein, battery replacement is not easy to perform.

In view of the aforementioned problems, it is an object of the present invention to provide a transponder which does not require a power source used in an in-wheel motor system and a wheel therewith.

Means for Solving the Problems

To achieve the aforementioned object, the present invention proposes a transponder, which is provided in an in-wheel motor system for rotating the wheel together with a rotor by a magnetic field formed by passing a predetermined current through a coil of a stator built in a wheel and having a magnetic substance and the coil and which transmits information by a predetermined signal, comprising: another coil having a predetermined number of turns; and energy conversion means of converting induced electromotive force produced as a result of a flux density penetrating through another coil being changed by the magnetic field into electric energy for a transponder, wherein the transponder operates on the electric energy produced by the energy conversion means.

According to a transponder consisting of the above structure, a magnetic field is formed by a coil supplied with current, and flux density penetrating through another coil changes to induced electromotive force. The energy conversion means converts the induced electromotive force into electric energy, and the electric energy drives the transponder.

Furthermore, to achieve the aforementioned object, the present invention proposes a transponder, which is provided in an in-wheel motor system for rotating the wheel together with a rotor by a magnetic field formed by passing a fixed current through a coil of a stator built in a wheel and having a magnetic substance and the coil and which transmits information by a fixed signal, comprising: a main circuit including a central processing section for producing and outputting an electric signal indicating reply information and transmitting means for transmitting a reply signal based on the electric signal indicating the reply information outputted from the central processing section; a sensor section for detecting a predetermined physical value of the wheel and outputting the detected result with an electric signal; means of making the central processing section which captures the detected result by the sensor section and includes the detected result in the reply information; another coil having a predetermined number of turns; and energy conversion means of converting induced electromotive force produced as a result of a flux density penetrating through another coil being changed by the magnetic field into electric energy for a transponder, wherein the transponder operates on the electric energy produced by the energy conversion means.

According to a transponder consisting of the above structure, an electric signal indicating reply information is produced by a central processing section. The sensor section detects the physical value of a wheel, and an electric signal of the detected result is outputted. Next, the main circuit includes the detected result in the reply information, and the transmission means transmits a reply signal based on the reply information. A magnetic field is formed by a coil supplied with a current, and flux density passing through another coil changes to induce an induced electromotive force. The energy conversion means converts the induced electromotive force into electric energy, thus driving the transponder.

Furthermore, to achieve the aforementioned object, the present invention proposes a transponder, which is provided in an in-wheel motor system for rotating the wheel together with a rotor by a magnetic field formed by passing a predetermined current through a coil of a stator built in a wheel and having a magnetic substance and the coil and which transmits information by a predetermined signal, comprising: a main circuit including a central processing section for producing and outputting an electric signal indicating reply information and transmitting means for transmitting a reply signal based on the electric signal indicating the reply information outputted from the central processing section; a sensor section for detecting a predetermined physical value of the wheel and outputting the detected result with an electric signal; means of making the central processing section which captures the detected result by the sensor section and includes the detected result in the reply information; another coil having a predetermined number of turns; energy conversion means of converting induced electromotive force produced as a result of a flux density penetrating through another coil being changed by the magnetic field into electric energy for a transponder; and a storage device for storing electric energy produced by the energy conversion means, wherein the transponder operates on the electric energy stored in the storage device.

According to a transponder consisting of the above structure, an electric signal indicating reply information is produced by a central processing section. The sensor section detects the physical value of a wheel, and an electric signal of the detected result is outputted. Next, the main circuit includes the detected result in the reply information, and the transmission means transmits a reply signal based on the reply information. A magnetic field is formed by a coil supplied with a current, and flux density passing through another coil changes to induce an induced electromotive force. The electric energy produced by the energy conversion means is stored in the storage device and drives the transponder. If no electric energy is produced by the energy conversion means, the transponder is driven by the electric energy stored in the storage device.

Furthermore, the present invention proposes a transponder having the above structure, further comprising: receiving means of receiving a predetermined electromagnetic wave and; second energy conversion means for converting the energy of the electromagnetic wave received by the receiving means into electric energy, wherein the transponder operates on concurrent use of the electric energy produced by the second energy conversion means and the electric energy produced by the energy conversion means.

According to a transponder having the above structure, when a predetermined electromagnetic wave is received by the receiving means, the electromagnetic wave energy is converted into electric energy by the second energy conversion means. Concurrent use of the electric energy and the electric energy produced by the energy conversion means drives the transponder.

Furthermore, the present invention proposes a transponder having the above structure, wherein the storage device consisting of a secondary battery.

According to a transponder having the above structure, a secondary battery is used as the storage device.

Furthermore, the present invention proposes a transponder having the above structure, wherein the storage device constituted of a large-capacity capacitor.

According to a transponder having the above structure, a large-capacity capacitor is used as the storage device.

Furthermore, the present invention proposes a transponder having the above structure, further comprising information storage means for storing unique identification information, wherein the central processing section having means of reading out identification information of the information storage means and including the information in the reply information.

According to a transponder having the above structure, information storage means stores identification information unique to the transponder, and the identification information is included in the reply information for transmission. Thus, even if a plurality of transponders concurrently transmit the reply signals, the transponder can be identified according to the identification information.

Furthermore, the present invention proposes a transponder having the above structure, wherein the sensor section includes at least any one of an acceleration sensor, a temperature sensor and an air pressure sensor as the sensor section.

According to a transponder having the above structure, the sensor section includes at least anyone of an acceleration sensor, a temperature sensor and an air pressure sensor, and information of the wheel detected by the sensor is included in the reply information for transmission.

Furthermore, the present invention proposes a transponder having the above structure, wherein another coil is disposed so as to penetrate through a magnetic field formed by the coil.

According to a transponder having the above structure, another coil is disposed so as to penetrate through a magnetic field formed by the coil. Thus, flux density penetrating through another coil changes more significantly, so that induced electromotive force to be induced increases.

Furthermore, the present invention proposes a transponder having the above structure, wherein another coil embedded in the rotor.

According to a transponder having the above structure, another coil is embedded in the rotor. Thus, flux density penetrating through another coil changes more significantly, and induced electromotive force to be induced increases.

Furthermore, to achieve the aforementioned object, the present invention proposes a wheel, which builds-in an in-wheel motor system equipped with a stator having a magnetic substance and a coil and a rotor and which rotates together with the rotor by a magnetic field formed by supplying a predetermined current to the coil of the stator, comprising: a transponder for transmitting information with a predetermined signal, wherein the transponder includes another coil having a predetermined number of turns and energy conversion means of converting induced electromotive force produced as a result of a flux density penetrating through another coil being changed by the magnetic field into electric energy for a transponder and operates on the electric energy produced by the energy conversion means.

According to a wheel having the above structure, a magnetic field is formed by a coil supplied with current, and flux density penetrating through another coil changes to generate induced electromotive force. The induced electromotive force is converted into an electric energy for a transponder by energy conversion means, thus providing a transponder operating on the electric energy.

Furthermore, to achieve the aforementioned object, the present invention proposes a wheel, which builds-in an in-wheel motor system equipped with a stator having a magnetic substance and a coil and a rotor and which rotates together with the rotor by a magnetic field formed by supplying a predetermined current to the coil of the stator, comprising a transponder for transmitting information with a predetermined signal, wherein the transponder includes a main circuit including a central processing section for producing and outputting an electric signal indicating reply information and transmitting means for transmitting a reply signal based on the electric signal indicating the reply information outputted from the central processing section, a sensor section for detecting a predetermined physical value of the wheel and outputting the detected result with an electric signal, means of making the central processing section which captures the detected result by the sensor section and includes the detected result in the reply information, another coil having a predetermined number of turns, and energy conversion means of converting induced electromotive force produced as a result of a flux density penetrating through another coil being changed by the magnetic field into electric energy for a transponder and operates on the electric energy produced by the energy conversion means.

According to a wheel consisting of the above structure, an electric signal indicating reply information is produced by a central processing section. The sensor section detects the physical value of a wheel, and an electric signal of the detected result is outputted. Next, the main circuit includes the detected result in the reply information, and the transmission means transmits a reply signal based on the reply information. A magnetic field is formed by a coil supplied with a current, and flux density passing through another coil changes to induce an induced electromotive force. The energy conversion means converts the induced electromotive force into electric energy for a transponder, thus driving the transponder.

Furthermore, to achieve the aforementioned object, the present invention proposes a wheel, which builds-in an in-wheel motor system equipped with a stator having a magnetic substance and a coil and a rotor and which rotates together with the rotor by a magnetic field formed by supplying a predetermined current to the coil of the stator, comprising a transponder for transmitting information with a predetermined signal, wherein the transponder includes a main circuit including a central processing section for producing and outputting an electric signal indicating reply information and transmitting means for transmitting a reply signal based on the electric signal indicating the reply information outputted from the central processing section, a sensor section for detecting a predetermined physical value of the wheel and outputting the detected result with an electric signal, means of making the central processing section which captures the detected result by the sensor section and includes the detected result in the reply information, another coil having a predetermined number of turns, energy conversion means of converting induced electromotive force produced as a result of a flux density penetrating through another coil being changed by the magnetic field into electric energy for a transponder, and a storage device for storing electric energy produced by the energy conversion means and operates on the electric energy stored in the storage device.

According to a wheel consisting of the above structure, in a transponder, an electric signal indicating reply information is produced by a central processing section. The sensor section detects the physical value of a wheel, and an electric signal of the detected result is outputted. Next, the main circuit includes the detected result in the reply information, and the transmission means transmits a reply signal based on the reply information. A magnetic field is formed by a coil supplied with a current, and flux density passing through another coil changes to induce an induced electromotive force. The electric energy produced by the energy conversion means is stored in the storage device and drives the transponder. If no electric energy is produced by the energy conversion means, the transponder is driven by the electric energy stored in the storage device.

Furthermore, the present invention proposes a wheel having the above structure, wherein the transponder includes receiving means of receiving a predetermined electromagnetic wave and second energy conversion means for converting the energy of the electromagnetic wave received by the receiving means into electric energy and operates on concurrent use of the electric energy produced by the second energy conversion means and the electric energy produced by the energy conversion means.

According to a wheel having the above structure, when a predetermined electromagnetic wave is received by the receiving means, the electromagnetic wave energy is converted into electric energy by the second energy conversion means. Concurrent use of the electric energy and the electric energy produced by the energy conversion means drives the transponder.

Furthermore, the present invention proposes a wheel having the above structure, wherein: the transponder has information storage means of storing unique identification information; and the central processing section has means of reading out identification information of the information storage means and including the information in the reply information.

According to a wheel having the above structure, information storage means stores identification information unique to the transponder, and the identification information is included in the reply information for transmission. Thus, even if a plurality of transponders concurrently transmit the reply signals, the transponder can be identified according to the identification information.

ADVANTAGES OF THE INVENTION

According to a transponder and a wheel therewith of the present invention, an electric current is supplied to a coil to form a magnetic field and to change flux density penetrating through another coil, and induced electric power generated at another coil is rectified, thus supplying electric energy to a sensor section more efficiently than a case where an electromagnetic wave is used as medium.

Since the electric current obtained by rectifying induced electric power generated at another coil is significantly larger than electric current required by a transponder, a storage device is constituted of a large-capacity capacitor or a secondary battery for sufficient storage, thus yielding very excellent effects that a main circuit as well as the sensor section can be driven and a transponder can be semipermanently operated by a storage device without need for a power supply.

The foregoing and/or further objects, features and advantages of the invention will become more apparent from the following description of preferred embodiments with reference to the accompanying drawings.

BRIEFLY DESCRIBE OF THE DRAWINGS

DESCRIPTION OF SYMBOLS

10 ... wheel, 11 ... tire, 12 ... hub, 13 ... stud bolt, 14 ... hexagonal nut, 15 ... wheel supporting section, 16 ... stator supporting arm, 17 ... axle, 20 ... wheel, 21 ... rim section, 22 ... disc section, 30 ... motor stator, 31 ... stator magnetic substance, 32 ... stator coil, 40 ... motor rotor, 50 ... disc brake, 51 ... brake disc, 52 ... brakecaliper, 100 ... transponder, 100a ... transponderbody, 100b ... charging coil section, 101 ... data transmit/receive antenna, 110 ... data transmit/receive section, 130 ... sensor circuit, 150 ... sensor power circuit, 151 ... rectification circuit (energy conversion means), 152 ... storage device, 153 and 154 ... diodes, 155 ... capacitor, 156 ... resistor, 157 ... charging coil, 157a ... lead wire, 200 ... monitor unit, 201 ... data transmit antenna, 202 ... data receive antenna, 210 ... data transmit section, 230 ... data receive section, 250 ... calculation section, 270 ... operation section, 301 ... multi-layer printed wiring circuit substrate, 303 ... chip-like electronic part, 304 ... IC chip, 310 ... resin portion, 401 ... cap tread, 402 ... under tread, 403A and 403B ... belt, 404 ... carcass

BEST MODE FOR CARRYING OUT THE INVENTION

Reference will be made in detail to preferred embodiments of the invention, examples of which are illustrated in the accompanying drawings.

Figure 1:
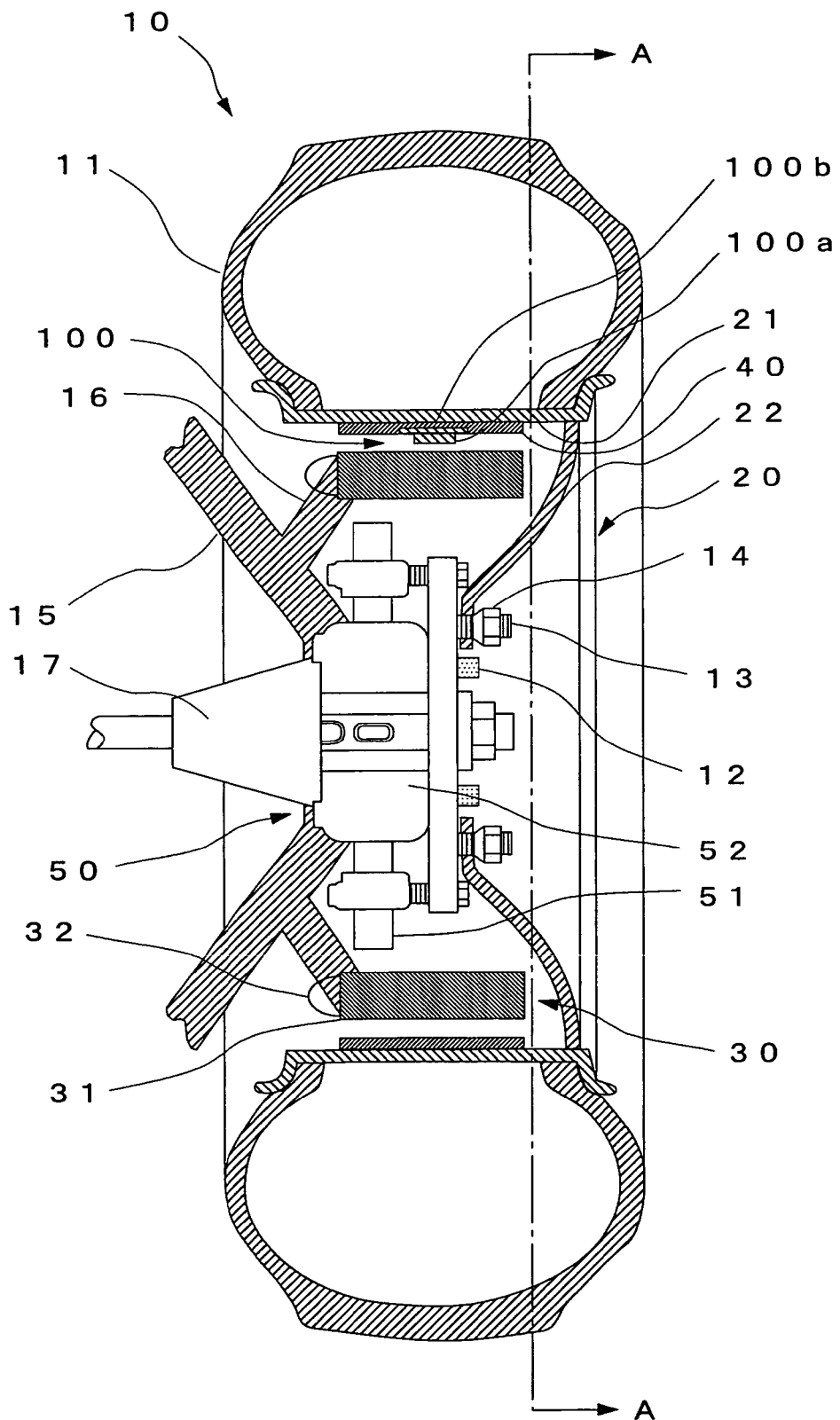
FIG. 1 is a cross-sectional view illustrating an outlined structure of a wheel used for an in-wheel motor system according to the first embodiment of the present invention.
Figure 2:
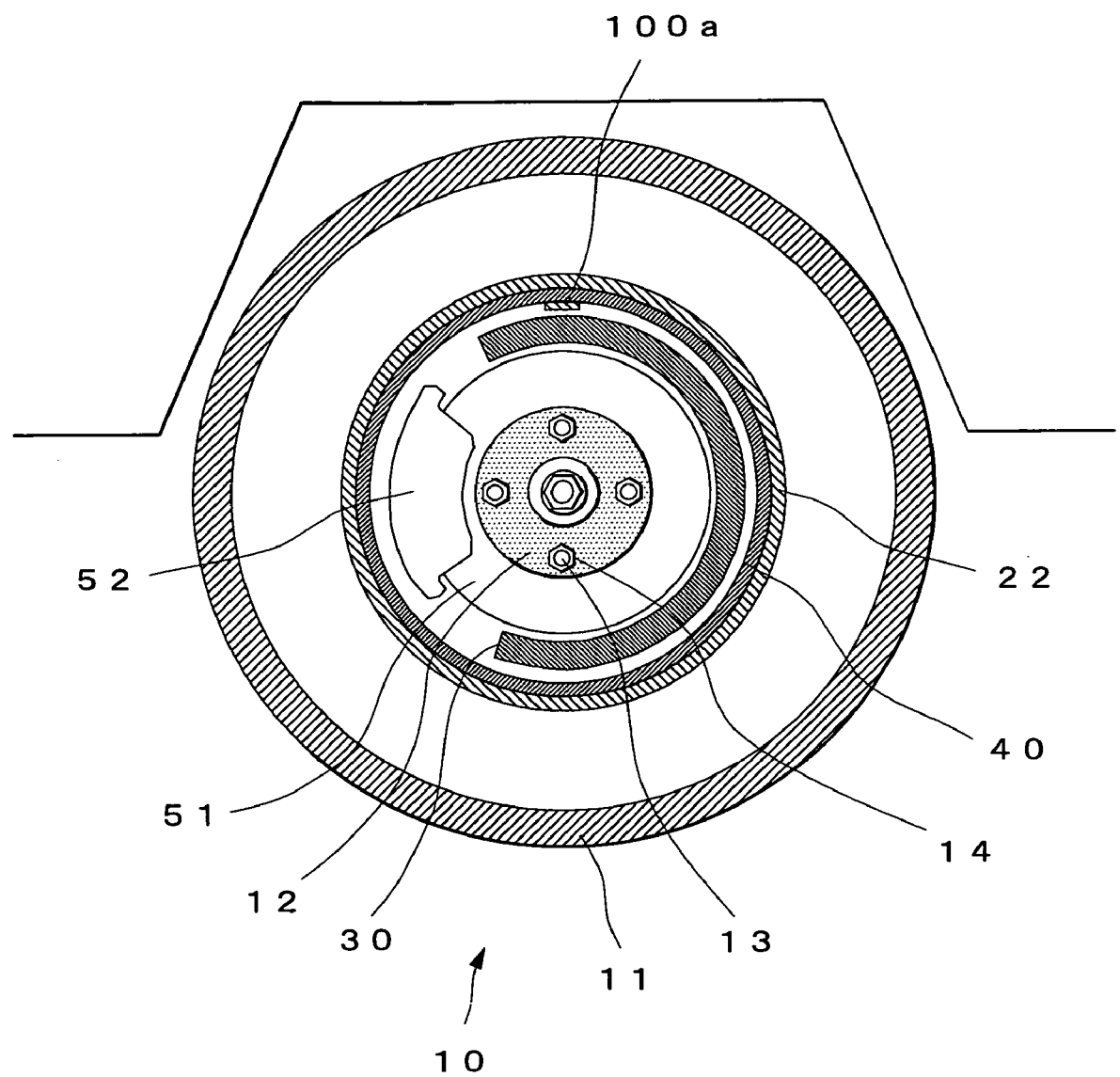
FIG. 2 is a cross-sectional view taken on line A-A of FIG. 1.

FIG. 1 is a cross-sectional view illustrating an outlined structure of a wheel used for an in-wheel motor system according to the first embodiment of the present invention, and FIG. 2 is a cross-sectional view taken on line A-A of FIG. 1.

In figures, a wheel 10 is a wheel for an in-wheel motor system with an induction motor built therein and includes a tire 11 and a wheel 20 mounted with a tire 11. The wheel 20 has a rim section 21 for mounting the tire 11, and a disc section 22 for coupling the rim section 21 to a hub 12.

Usually four to six stud bolts 13 vertically set on the hub 12 are passed through holes formed in the disc section 22 and secures the whole wheel 20 with hexagonal nuts 14 respectively. The hub 12 is rotatably supported on a wheel supporting section 15 through bearings or the like and rotates together with an axle 17.

In the case of a hybrid type vehicle equipped with a drive source such as an engine, the axle 17 is included as driving force transmission means except the in-wheel motor system, and a disc brake 50 is assembled into as brake means.

The disc brake 50 includes a brake disc 51 which is secured on the hub 12 and rotates together with the wheel 10, and a brake caliper 52 fixed on the wheel supporting section 15. By pressing a brake pad (not illustrated) in the brake caliper 52 against the brake disc 51, braking force is produced.

The wheel supporting section 15 is fixed on a vehicle and supports the axle 10 through the hub 12. In the wheel supporting section 15, a stator supporting arm 16 extends toward an internal surface of a rim section 21, and the front end thereof is supported with a motor stator 30. The motor stator 30 has a stator magnetic substance 31 and a stator coil 32 wound therearound. In this embodiment, the motor stator 30 has a partially cut shape, or has no total circumference, so as to bypass the brake caliper 52 as illustrated in FIG. 2. However, it is preferable that the wheel not assembled with the disc brake 50 should have the total circumference.

On the internal surface of the rim section 21, a motor rotor 40 having a magnetic substance such as a permanent magnet is fixed all around so as to face the motor stator 30. The motor rotor 40 does not always need to be fitted all around. However, preferably, the motor rotor 40 should be fitted at all portions facing the motor stator 30 for higher efficiency. Furthermore, the motor rotor 40 may be fixed on an external surface of the rim section 21. Also, the rim section 21 or a disc section 22 may be constituted as the motor rotor 40.

In this embodiment, a drive source such as an engine is included, and an in-wheel motor system for a vehicle equipped with an axle 17 and a disc brake 50 is shown, however, it goes without saying that this embodiment is applicable to a vehicle equipped with only a drive source with a motor. Moreover, the above configuration is just an example of an in-wheel motor system including an induction motor in a wheel and will not restrict types, configurations, or materials to be used.

Figure 3:
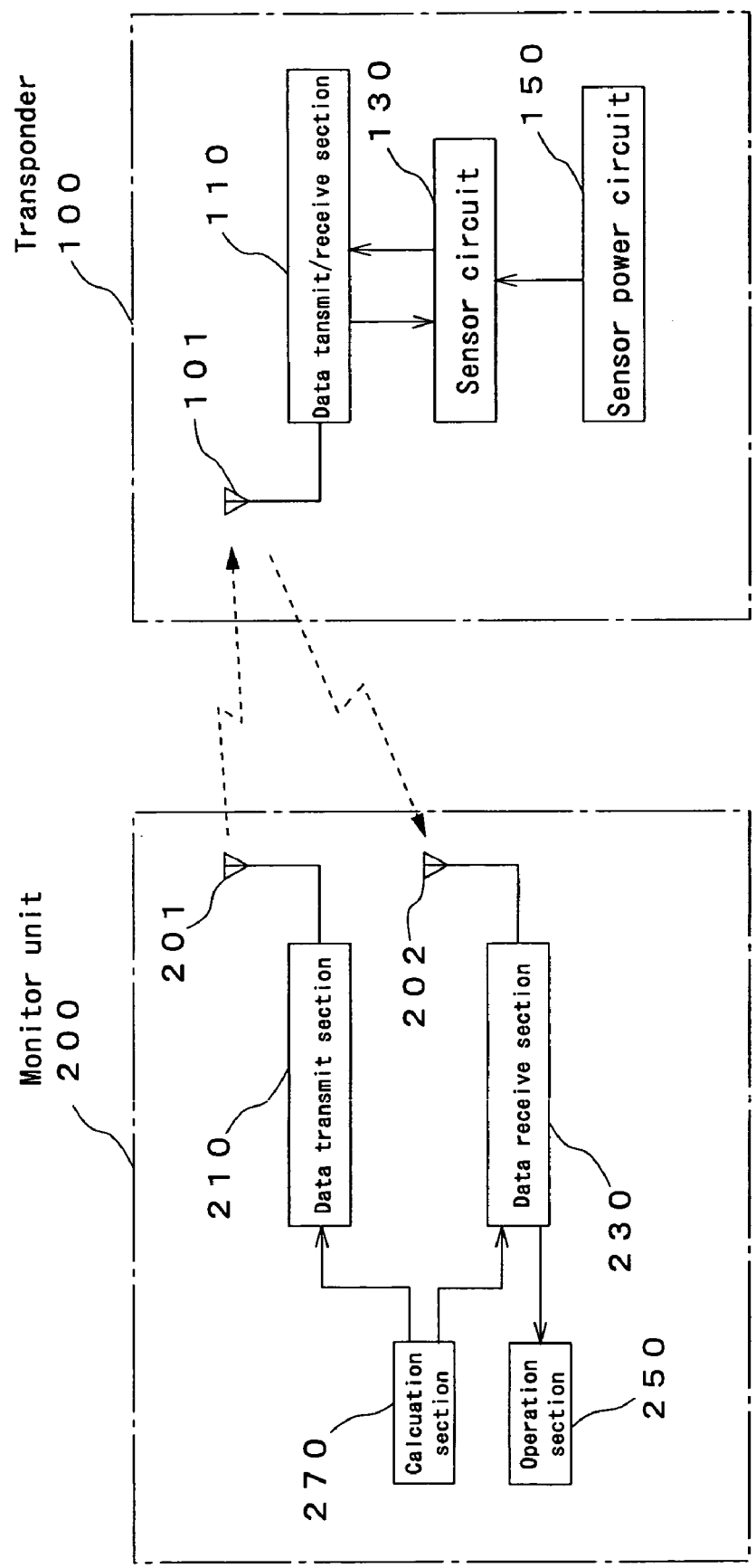
FIG. 3 is a view illustrating communication between a transponder and a monitor unit according to the first embodiment of the present invention.
Figure 4:
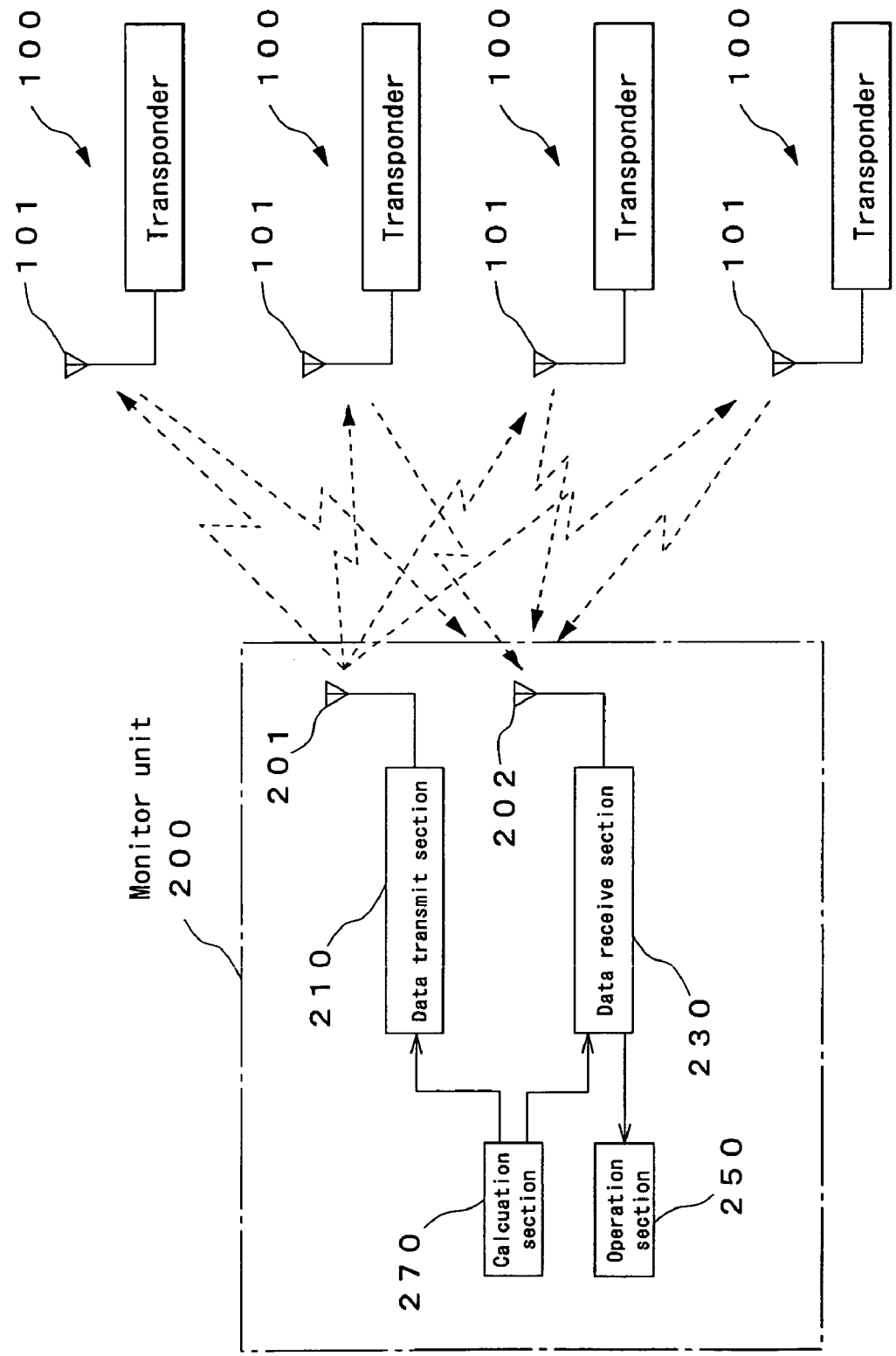
FIG. 4 is a view illustrating another communication between a transponder and a monitor unit according to the first embodiment of the present invention.
Figure 5:
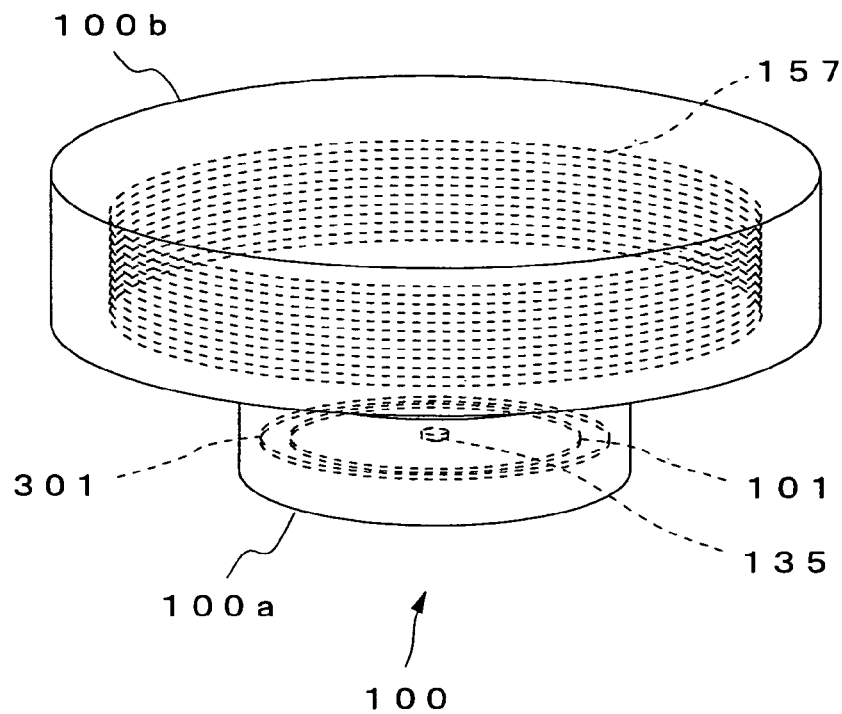
FIG. 5 is an external perspective view of a transponder according to the first embodiment of the present invention.
Figure 6:
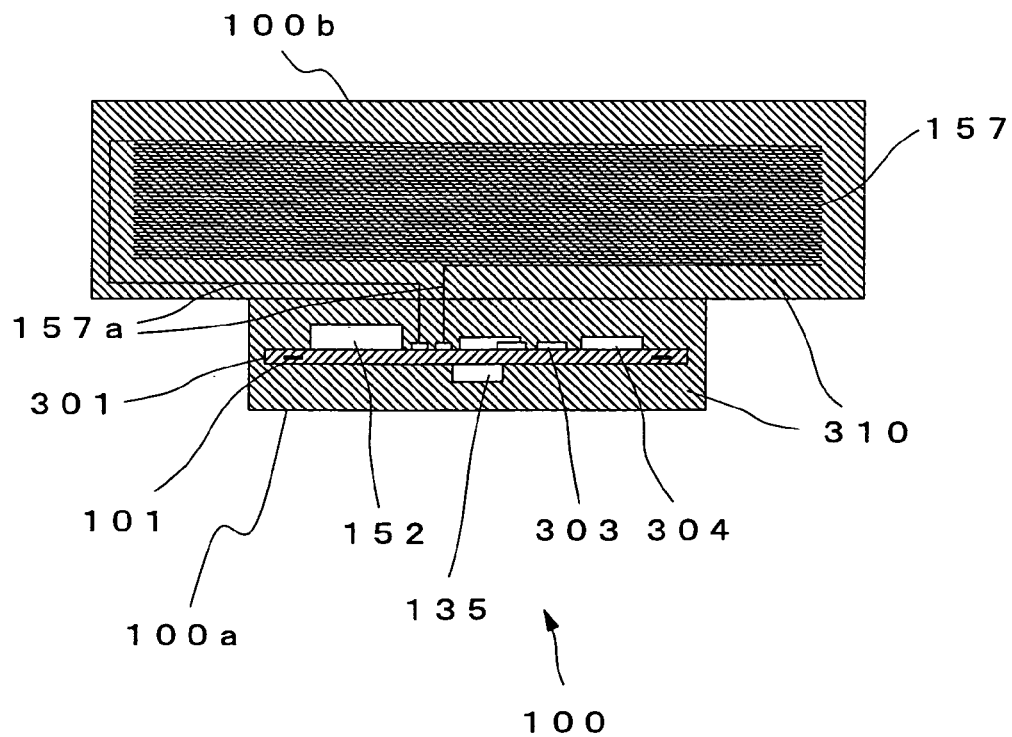
FIG. 6 is a sectional side view of a transponder according to the first embodiment of the present invention.
Figure 7:
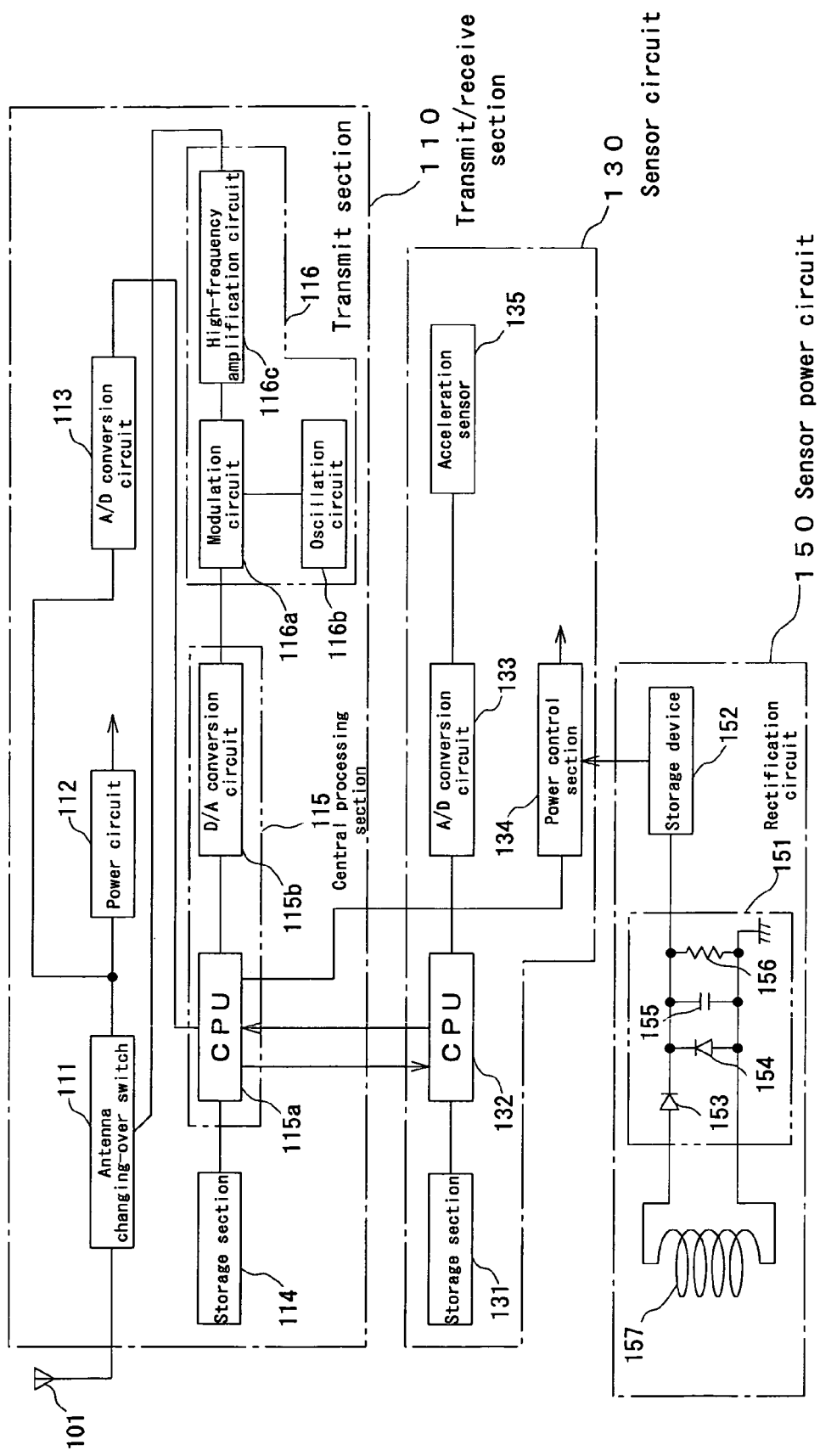
FIG. 7 is a block diagram illustrating a configuration of a transponder illustrated in FIGS. 5 and 6.
Figure 8:
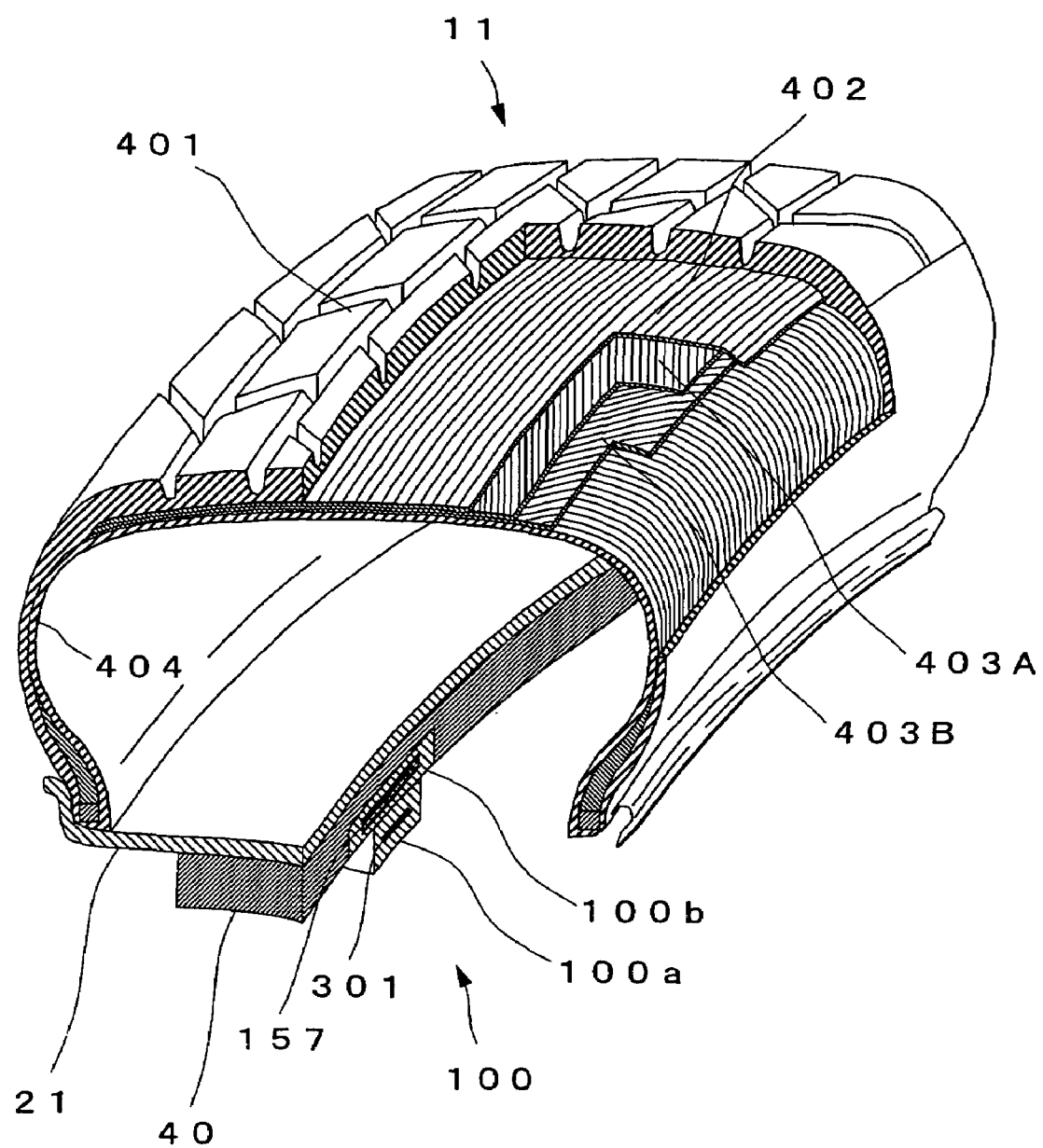
FIG. 8 is a view illustrating a mounting state of a transponder according to the first embodiment of the present invention.

Next, a description will be made on a configuration of a transponder 100. FIG. 3 is a view illustrating communication between a transponder and a monitor unit according to the first embodiment of the present invention, FIG. 4 is a view illustrating another communication between a transponder and a monitor unit according to the first embodiment of the present invention, FIG. 5 is an external perspective view of a transponder according to the first embodiment, FIG. 6 is a sectional side view of a transponder according to the first embodiment, FIG. 7 is a block diagram illustrating a configuration of a transponder illustrated in FIGS. 5 and 6, and FIG. 8 is a view illustrating a mounting state of a transponder according to the first embodiment.

The transponder 100 detects information of states of a wheel including a tire, such as acceleration, temperature, air pressure and rotational speed of a tire and transmits the information to a monitor unit 200 at a position distant from the tire.

In FIG. 3, the transponder 100 is constituted of data transmit/receive antenna 101, a data transmit/receive section 110, a sensor circuit 130, and a sensor power circuit 150. A reference numeral 200 is a monitor unit consisting of a data transmit/receive antenna 201, a data transmit section 210, a data receive section 230, a calculation section 250, and an operation section 270.

In reading out data of the acceleration of the tire 11 from the transponder 100, a transmit command of a question signal is inputted from the operation section 270, and the data transmit section 210 transmits the question signal through the transmit antenna 201. When a reply signal is transmitted from the transponder 100 in response to the transmission, a receive command of the reply signal is inputted from the operation section 270, and the data receive section 230 receives the reply signal through a data receive antenna 102. The reply signal is outputted to the calculation section 250, and the calculation section 250 reads out tire information from the reply signal.

The present invention is not limited to a case where one monitor unit 200 transmits and receives signals to/from one transponder 100 as illustrated in FIG. 3, and communications with the plurality of transponders 100 may be made like a case where one monitor unit 200 reads out tire information from the respective transponders 100 mounted on the four wheels 10. In this case, a reply signal described later is transmitted including its own identification information, and the calculation section 250 stores identification information of the transponder 100 in advance, thus concurrently identifying the plurality of transponders 100.

The signal transmission of the transponder 100 is not limited to the above embodiment, and for example, a reply signal may be transmitted without need for receiving a question signal transmitted by the monitor unit 200.

In FIGS. 5 and 6, the transponder 100 consists of a transponder body 100*a* and a charging coil section 100*b*.

The transponder body 100*a* is formed by molding an on-part disc-shaped multi-layer printed wiring circuit substrate 301 (hereinafter referred to as a "circuit substrate"), with resin 310, embedded with a circular loop-shaped data transmit/receive antenna 101 in an inter layer of the circuit substrate 301, and implemented with a storage device 152 and a plurality of chip-like electronic parts 303 and IC chips 304 on a surface of the circuit substrate 301. On a rear face of the circuit substrate 301, a columnar chip-like acceleration sensor 135 is implemented. The on-part circuit substrate. 301 is sealed with resin 310, and the resin 310 is formed into a flat and columnar shape.

The charging coil section 100*b* is formed by molding a charging coil 157 with resin 310, and a charging coil 157 is connected with part of the chip-like electronic parts 303 of the transponder 100*a* through a lead wire 157*a* and sealed with the resin 310, and the resin 310 is formed into a flat and columnar shape. The charging coil 157 may use any coil and will not restrict types, configurations, or materials to be used. The present invention uses such a configuration that the charging coil section 100*b* has only the charging coil 157 as one embodiment, however, may use such all circuits to constitute a sensor power circuit 150 described later.

In a block diagram of the transponder 100 illustrated in FIG. 7, a data transmit/receive section 110 is constituted of an antenna changing-over switch 111, a power circuit 112, an analog/digital (hereinafter referred to as "A/D") conversion circuit 113, a storage section 114, a central processing section 115 consisting of a CPU 115*a* and a digital/analog (hereinafter referred to as "D/A") conversion circuit 115*b*, and a transmit section 116 consisting of a modulation circuit 116*a*, an oscillation circuit 116*b* and a high-frequency amplification circuit 116*c*.

The antenna changing-over switch 111, constituted of an electronic switch or the like, changes over the data transmit/receive antenna 101 to the power circuit 112 and either of the A/D conversion circuit 113 or the transmit section 116 for connection by a control signal from the CPU 115*a*. The antenna 101 is usually connected to the side of the power circuit 112.

The power circuit 112 forms a known full-wave rectification circuit (second energy conversion means). The antenna 101 is connected to the input side of the power circuit 112 through the antenna changing-over switch 111. The power circuit 112 rectifies a high-frequency current induced in the antenna 101 to convert it into a DC current, which is outputted as a driving power source for other circuits such as the central processing section 115, the storage section 114 and the transmit section 116.

The A/D conversion circuit 113, after detecting a received question signal, is converted into digital data and outputted to the CPU 115*a*.

The central processing section 115 is constituted of the known CPU 115*a* and the D/A conversion circuit 115*b*. The CPU 115*a*, when it is driven with power supplied and a question signal is inputted from the A/D conversion circuit 113, drives the sensor circuit 130, captures detected results of temperature and humidity, produces reply information including the detected results and its unique identification information, and transmits the information as a reply signal through the D/A conversion circuit 115*b* and the transmit section 116.

The identification information are identification information unique to the respective transponders 100 stored in the storage section 114 consisting of a nonvolatile semiconductor memory capable of electric rewriting such as EEPROM (electrically Erasable Programmable Read-only Memory), and are previously stored in an area designated as being incapable of rewriting in the storage section 114 at the time of manufacturing the transponder 100.

The transmit section 116 consists of the modulation circuit 116*a*, the oscillation circuit 116*b* and the high-frequency amplification circuit 116*c*, and a carrier wave oscillated by the oscillation circuit 116*b* is modulated by the modulation circuit 116*a* based on an information signal inputted from the central processing section 115, which is then supplied to the antenna 101 through the high-frequency amplification circuit 116*c* and antenna changing-over switch 111.

The sensor circuit 130 is constituted of the storage section 131, the CPU 132, the A/D conversion circuit 133, a power control section 134, and an acceleration sensor 135. The present invention uses, in this embodiment, the acceleration sensor 135 for detecting accelerations in three directions orthogonal to each other generated with the rotation of a wheel as a sensor for detecting information of an internal tire, however, may modify or add a temperature sensor, an air pressure sensor, or rotational speed sensor according to an object or application thereof.

The CPU 132 makes communications with the CPU 115*a* of the transmit/receive section 110 and, upon receiving a request of acceleration information from the CPU 115*a*, acquires temperature information and pressure information detected by the acceleration sensor 135 through the A/D conversion circuit 133 and transmits the information to the CPU 115*a*.

The power control section 134, constituted of, for example, an electronic switch and a boosting type power circuit and so on, turns on and off the electronic switch based on a control signal from the CPU 115*a* of the data transmit/receive section 110, converts the electric power outputted from the sensor power circuit 150 into the voltage required for circuit operation and supplies the voltage to the storage section 131, the CPU 132, the A/D conversion circuit 133 and the acceleration sensor 135. As described later, the power control section 134 can supply the electric power outputted from the sensor power circuit 150 in place of the power circuit 112.

The sensor power circuit 150 is constituted of a rectification circuit 151 (energy conversion means), storage device 152, and a charging coil 157. The rectification circuit 151 is constituted of diodes 153, 154, a capacitor 155, and a resistor 156 to form a known full-wave rectification circuit. The input side of the rectification circuit 151 is connected to the charging coil 157, and the output side of the rectification circuit 151 is connected to the storage device 152 and to the power control section 134.

As illustrated in FIG. 8, the transponder body 100*a* is mounted on a surface of the motor rotor 40 provided so as to face the motor stator 30 on an internal surface of the rim section 21 in the tire, and the charging coil section 100*b* is embedded in the rotor 40 so that the axis of the charging coil 157 may be roughly perpendicular to a surface of the rotor 40. Preferably, the charging coil section 100*b* is embedded in the rotor 40 for higher efficiency, however, may be mounted on a surface of the rotor 40.

The tire 11 used in this embodiment is, for example, a known tubeless radial tire, and is constituted of a known cap tread 401, an under-tread 402, belts 403A, 403B and a carcass 404 and so on. The number of the transponders 100 mounted on the rotor 40 is not always to one and may be two or more. In the charging coil 157, induced electromotive force described later increases by making the coil penetrate through a magnetic field produced by the motor stator 30.

In the in-wheel motor system, when a predetermined three-phase AC current is supplied to the stator coil 32, a revolving magnetic field is produced around the motor stator 30. The revolving magnetic field causes the rim section 21 including the motor rotor 40 to receive rotational force and rotate along with the wheel 10.

The electric current supplied at this time allows the motor stator 30 to produce a magnetic field, so that the magnetic flux penetrating through the charging coil 157 mounted in the transponder 100 changes to produce an induced electromotive force in the charging coil 157. The induced electromotive force will not cause energy loss by transmission and reception like an electromagnetic wave, therefore the sensor power circuit 150 can perform energy conversion with higher efficiency than the power circuit 112, and much larger electric energy can be achieved than the energy which the whole transponder 100 as well as the sensor circuit 130 requires.

According to the transponder 100 consisting of the above configuration and the wheel 10 therewith, current is supplied to the stator coil 32 to produce a magnetic field, so that the magnetic flux penetrating through the charging coil 157 changes, the rectification circuit 151 rectifies the induced electromotive force produced by the charging coil 157 and converts it into DC current, thus the sensor power circuit 150 can supply electric energy to the sensor circuit 130 with higher efficiency than the power circuit 112 for driving the transmit/receive section 110 with an electromagnetic wave as medium.

The current produced by rectifying an induced electromotive force generated at the charging coil 157 is much larger than the current the transponder 100 requires, therefore the storage device 152 is constituted of, for example, a large-capacity capacitor or a secondary battery for significant storage, thus the sensor power circuit 150 drives the sensor circuit 130 as well as the transmit/receive section 110 and, even under such a stopping state that the wheel is not running, the transponder 100 can be semi-permanently operated by the storage device 152 without need for a power supply.

The mounting position of the transponder 100 is not limited to the rotor 40 and may be used if it has an effect of a magnetic field produced by the motor stator 30 in the wheel 10. The transponder 100 is not limited to what detects the information of the tire and may be used if it is applicable to the in-wheel motor system.

For example, by mounting in the brake disc 51 the transponder 100 equipped with a temperature sensor fitted so as to be penetrated through a magnetic field produced by the motor stator 30, a temperature change in the brake disc 51 can be detected without need for a power supply.

It is further understood that the present invention is not limited to the details of configurations and arrangements of foregoing embodiments and that various changes and modifications may be made in the present invention without departing from the spirit and scope thereof.

INDUSTRIAL APPLICABILITY OF THE INVENTION

The transponder mounted on the wheel of the in-wheel motor system rectifies the induced electromagnetic force produced by the coil provided in the transponder for electricity storage, and thus can be used for applications where electric energy is supplied to an electric circuit provided on the wheel.

The invention claimed is:

1. A transponder, which is provided in an in-wheel motor system for rotating the wheel together with a rotor by a magnetic field formed by passing a predetermined current through a coil of a stator built in a wheel and having a magnetic substance and the coil and which transmits information by a predetermined signal, comprising:
    another coil having a predetermined number of turns; and
    energy conversion means of converting induced electromotive force produced as a result of a flux density penetrating through another coil being changed by the magnetic field into electric energy for a transponder, wherein the transponder operates on the electric energy produced by the energy conversion means.

2. The transponder according to claim 1, wherein another coil is disposed so as to penetrate through a magnetic field formed by the coil.

3. A transponder, which is provided in an in-wheel motor system for rotating the wheel together with a rotor by a magnetic field formed by passing a predetermined current through a coil of a stator built in a wheel and having a magnetic substance and the coil and which transmits information by a predetermined signal, comprising:
    a main circuit including a central processing section for producing and outputting an electric signal indicating reply information and transmitting means for transmitting a reply signal based on the electric signal indicating the reply information outputted from the central processing section;
    a sensor section for detecting a predetermined physical value of the wheel and outputting the detected result with an electric signal;
    means of making the central processing section which captures the detected result by the sensor section and includes the detected result in the reply information;
    another coil having a predetermined number of turns; and
    energy conversion means which converts induced electromotive force produced as a result of a flux density penetrating through another coil being changed by the magnetic field into electric energy for a transponder, wherein the transponder operates on the electric energy produced by the energy conversion means.

4. The transponder according to claim 3, further comprising:
    receiving means of receiving a predetermined electromagnetic wave and;
    second energy conversion means for converting the energy of the electromagnetic wave received by the receiving means into electric energy, wherein the transponder operates on concurrent use of the electric energy produced by the second energy conversion means and the electric energy produced by the energy conversion means.

5. The transponder according to claim 3, further comprising information storage means for storing unique identification information, wherein the central processing section has means of reading out identification information of the information storage means and including the information in the reply information.

6. The transponder according to claim 3, wherein the sensor section includes at least any one of an acceleration sensor, a temperature sensor and an air pressure sensor.

7. A transponder, which is provided in an in-wheel motor system for rotating the wheel together with a rotor by a magnetic field formed by passing a predetermined current through a coil of a stator built in a wheel and having a magnetic substance and the coil and which transmits information by a predetermined signal, comprising:

a main circuit including a central processing section for producing and outputting an electric signal indicating reply information and transmitting means for transmitting a reply signal based on the electric signal indicating the reply information outputted from the central processing section;

a sensor section for detecting a predetermined physical value of the wheel and outputting the detected result with an electric signal;

means of making the central processing section which captures the detected result by the sensor section and includes the detected result in the reply information;

another coil having a predetermined number of turns;

energy conversion means of converting induced electromotive force produced as a result of a flux density penetrating through another coil being changed by the magnetic field into electric energy for a transponder; and a storage device for storing electric energy produced by the energy conversion means, wherein the transponder operates on the electric energy stored in the storage device.

8. The transponder according to claim 7, wherein the storage device consists of a secondary battery.

9. The transponder according to claim 7, wherein the storage device consists of a large-capacity capacitor.

10. The transponder according to claim 1, wherein another coil is embedded in the rotor.

11. A wheel, which builds-in an in-wheel motor system equipped with a stator having a magnetic substance and a coil and a rotor and which rotates together with the rotor by a magnetic field formed by supplying a predetermined current to the coil of the stator, comprising a transponder for transmitting information with a predetermined signal, wherein the transponder includes another coil having a predetermined number of turns and energy conversion means of converting induced electromotive force produced as a result of a flux density penetrating through another coil being changed by the magnetic field into electric energy for a transponder and operates on the electric energy produced by the energy conversion means.

12. A wheel, which builds-in an in-wheel motor system equipped with a stator having a magnetic substance and a coil and a rotor and which rotates together with the rotor by a magnetic field formed by supplying a predetermined current to the coil of the stator, comprising a transponder for transmitting information with a predetermined signal, wherein the transponder includes a main circuit including a central processing section for producing and outputting an electric signal indicating reply information and transmitting means for transmitting a reply signal based on the electric signal indicating the reply information outputted from the central processing section, a sensor section for detecting a predetermined physical value of the wheel and outputting the detected result with an electric signal, means of making the central processing section which captures the detected result by the sensor section and includes the detected result in the reply information, another coil having a predetermined number of turns, and energy conversion means of converting induced electromotive force produced as a result of a flux density penetrating through another coil being changed by the magnetic field into electric energy for a transponder and operates on the electric energy produced by the energy conversion means.

13. The wheel according to claim 12, wherein the transponder includes receiving means of receiving a predetermined electromagnetic wave and second energy conversion means for converting the energy of the electromagnetic wave received by the receiving means into electric energy and operates on concurrent use of the electric energy produced by the second energy conversion means and the electric energy produced by the energy conversion means.

14. The wheel according to claim 12, wherein:
the transponder includes information storage means of storing unique identification information; and
the central processing section has means of reading out identification information of the information storage means and including the information in the reply information.

15. A wheel, which builds-in an in-wheel motor system equipped with a stator having a magnetic substance and a coil and a rotor and which rotates together with the rotor by a magnetic field formed by supplying a predetermined current to the coil of the stator, comprising a transponder for transmitting information with a predetermined signal, wherein the transponder includes a main circuit including a central processing section for producing and outputting an electric signal indicating reply information and transmitting means for transmitting a reply signal based on the electric signal indicating the reply information outputted from the central processing section, a sensor section for detecting a predetermined physical value of the wheel and outputting the detected result with an electric signal, means of making the central processing section which captures the detected result by the sensor section and includes the detected result in the reply information, another coil having a predetermined number of turns, energy conversion means of converting induced electromotive force produced as a result of a flux density penetrating through another coil being changed by the magnetic field into electric energy for a transponder, and a storage device for storing electric energy produced by the energy conversion means and operates on the electric energy stored in the storage device.

* * * * *